United States Patent [19]

Grevich et al.

[11] 4,305,240
[45] Dec. 15, 1981

[54] PACKAGE FORMING AND SEALING APPARATUS

[75] Inventors: John J. Grevich, Star Prairie; John J. Gardetto, Hayward; Garry H. Russell, Star Prairie, all of Wis.

[73] Assignee: Domain Industries, New Richmond, Wis.

[21] Appl. No.: 54,991

[22] Filed: Jul. 5, 1979

[51] Int. Cl.³ .................... B65B 9/10; B65B 51/16
[52] U.S. Cl. ........................ 53/373; 53/550; 53/568; 53/562; 493/194; 493/206; 493/208
[58] Field of Search ............ 53/450, 455, 459, 479, 53/550, 562, 567, 568, 373; 93/13, 1 F, 33 H; 156/583.1; 493/194, 197, 206, 208

[56] References Cited

U.S. PATENT DOCUMENTS

| | | | |
|---|---|---|---|
| 1,814,699 | 7/1931 | Hubbell | 279/113 |
| 2,976,657 | 3/1961 | Cloud | 53/550 X |
| 3,126,682 | 3/1964 | Krance | 53/450 X |
| 3,388,526 | 6/1968 | Harm | 53/550 X |
| 3,866,394 | 2/1975 | Masai | 53/562 |
| 3,943,683 | 3/1976 | Kovacs | 53/550 X |
| 4,045,946 | 9/1977 | Schaefer | 53/550 |
| 4,170,171 | 10/1979 | Beasley | 93/37 R |

Primary Examiner—John Sipos
Attorney, Agent, or Firm—H. Dale Palmatier

[57] ABSTRACT

A package forming and sealing machine receiving articles confined within a conveyed tubular wrapper of sheet material, a rotor having sealing and cutting heads radially adjustable for changing the span between adjacent heads on the periphery of the rotor, there being a swingable jaw and a stationary jaw on each of the heads, a locking linkage to operate the swingable jaw, a rotary shaft to operate the linkage, and substantially continuously driven from a sprocket through a disengageable clutch operated by a trip arm and stationary stop cams also radially adjustable with respect to the rotor axis, a chain loop embracing revolving sprockets on the rotor to produce operation of the swingable sealing jaws.

33 Claims, 17 Drawing Figures

PACKAGE FORMING AND SEALING APPARATUS

This invention relates to apparatus for and the method of producing individual article-containing packages from an elongate and substantially endless tubular wrapper confining articles in spaced relation to each other and wherein the wrapper is to be cut off between the articles and closed by sealing to form the individual packages.

BACKGROUND OF THE INVENTION

High speed packaging of articles in a film wrapper has been commonly accomplished by confining the articles within a tubular wrapper which is then cut off and closed by sealing to form the individual packages. Length of the packages will vary with the length of the articles being wrapped. The sealing and cutoff machine must accommodate packages of various lengths and must produce a reasonable amount of dwell time during sealing so that the sealing can be efficiently accomplished through all of the layers of film that may be present in the seal area. The sealable film material may vary considerably in its characteristics and in some instances, the film material will require a significant dwell time during sealing in order to produce the seal of the type desired. Oftentimes packages will have gussets at the sides which increases the number of thicknesses through which sealing must be accomplished. The film material may be polyethylene, or foil with a polyethylene backing laminated to it, or any of a wide variety of films of a wide variety of thicknesses.

In order to accommodate packages of various lengths, prior art machines have releasably mounted sealing and cutoff heads on a rotor so as to grip, seal, and cut off the tubular film casing between adjacent articles as the head revolves with the rotor. A certain amount of dwell time is thereby obtained during which sealing is accomplished. Because the sealing and cutoff heads are releasably mounted on the rotor, the spacing therebetween is indeterminate. As the entubed articles enter the machine, some type of indicator actuates a sealing head and causes it to firmly attach itself to the rotor so as to travel with the traveling entubed article and effectuate the sealing and cutting. After the sealing has been accomplished in the prior art machines, the sealing head is again released from the rotor, to be stacked up with other similar heads, as to be available when needed again to seal and cut off another package.

Somewhat similar machines have been used wherein the sealing and cutoff heads are releasably connected to roller chains so as to travel a straight course, along one of the runs of the chain, during a sealing and cutoff of the tubular wrapper.

However, in the ordinary course of production, the articles being packaged are usually of a constant size. The size of the articles may change somewhat from one production run to the next one, and in view of the reliability of other machinery for accurately spacing the articles from each other along the tubular film casing, the individual sensing of each article is not entirely necessary. Other prior art machines have effectively produced sealing and cutoff of the tubular casing of sheet material for packages of constant length.

SUMMARY OF THE INVENTION

An object of the present invention is to provide an apparatus for and a method of readily and easily varying the length of packages produced to accommodate the packaging of articles of various lengths or sizes entubed within a tubular wrapper of sheet material.

Another object of the invention is to provide an apparatus for and a method of minimizing the down time during conversion of the sealing and cutoff machine for accommodating articles and packages of various sizes between production runs.

Still another object of the invention is to provide improved apparatus in a package forming machine, for operating the sealing and cutoff head for cutting and sealing the entubing sheet material between adjacent articles confined within the tubing.

A feature of the present invention is the mounting of sealing heads on a rotor in radial guideways to accommodate significant radial repositioning of the heads and an apparatus to produce idential radial movement of all of the heads on the rotor simultaneously so that the spacing between adjacent heads remains uniform around the entire periphery of the rotor and as to change the distance between adjacent heads and thereby accommodate packages of various sizes.

Another feature of the invention is the provision of the individually actuated and clutched mechanical drives for the several sealing and cutoff heads moving on the rotor for individually controlling each of the heads for producing sealing for a significant length of time and swinging the jaws on the head to open positions by individual crank arms and linkages on each of the heads.

Another feature of the present invention is the mounting of the sealing heads in radial guideways on the rotor, each being controlled by a trip arm engaging a cam during the turning of the rotor and head, and the cams also being radially adjustable as the heads are radially adjusted as to accommodate continued actuation of the sealing and cutoff heads at their various portions of the cycle.

Another feature of the present invention is the provision of sealing and cutoff heads radially adjustable on the rotor to accommodate packages of various lengths and wherein the heads have individual rotary drives for swinging the movable jaws to open and closed positions, the rotary drives being powered by sprockets which roll along a loop of a roller chain which follows a peripheral portion of the rotor, the loop of the chain being constrictable and distensible to accommodate the radial inward and outward adjustment of the several heads while still producing the coordinated operation of the jaws. It is desirable that the chain be adapted to travel around the loop as to adjust the relative speed between the rotor periphery and the chain to thereby control the rate at which the sprockets roll on the chain and the rate at which the jaws on the heads are operated.

Another feature of the present invention is the provision of a novel method of producing packages of various sizes from articles spaced and entubed within a film wrapper by sealing and cutting the wrapper between the adjacent articles and tubes therein while obtaining a significant amount of sealing time to effect efficient sealing through multiple thicknesses of the wrapper, and moving the sealing jaws around an arc of a circular path during the course of sealing, and subsequently adjusting the radial position of the sealing jaws in order to accommodate packages of all different desired lengths.

A very substantial advantage of the present invention is to accommodate the sealng and cutoff of packages of different lengths in successive production runs while minimizing the type of controls needed to accomplish the operation of the sealing and cutoff heads and also minimizing the down time of the wrapping and packaging machinery during changeover from one size of packages to another size of packages.

It will be apparent that the package forming and sealing rotor will in many instances be oriented in upright position so as to revolve on a horizontal axis.

In other instances the rotor may be oriented in horizontal position so as to revolve about an upright or vertical axis. It may be that, under certain circumstances, the individual packages will be severed from the wrapper as the ends of the packages are being sealed. In other instances, cutting of the wrapper on the rotor will be eliminated so that only sealing between the packages is effected.

When the rotor is horizontally oriented so as to revolve about a vertical axis, an unfilled, but folded wrapper may be applied to the rotor so as to define a succession of pouches between the sealing heads, each pouch being open along the top edge. While the sealing of the film continues, each of the pouches may be filled with a quantity of granular or liquid material or a number of articles. Subsequently, the film may be withdrawn from the machine without being cut and then subsequently cut after the edge of the pouch is sealed.

BRIEF DESCRIPTION OF THE DRAWINGS

FIGS. 1–3 omit substantial detail in order to emphasize the varying operating modes.

DETAILED SPECIFICATION

One form of the invention is illustrated in the drawings and is described herein.

Figure 1:
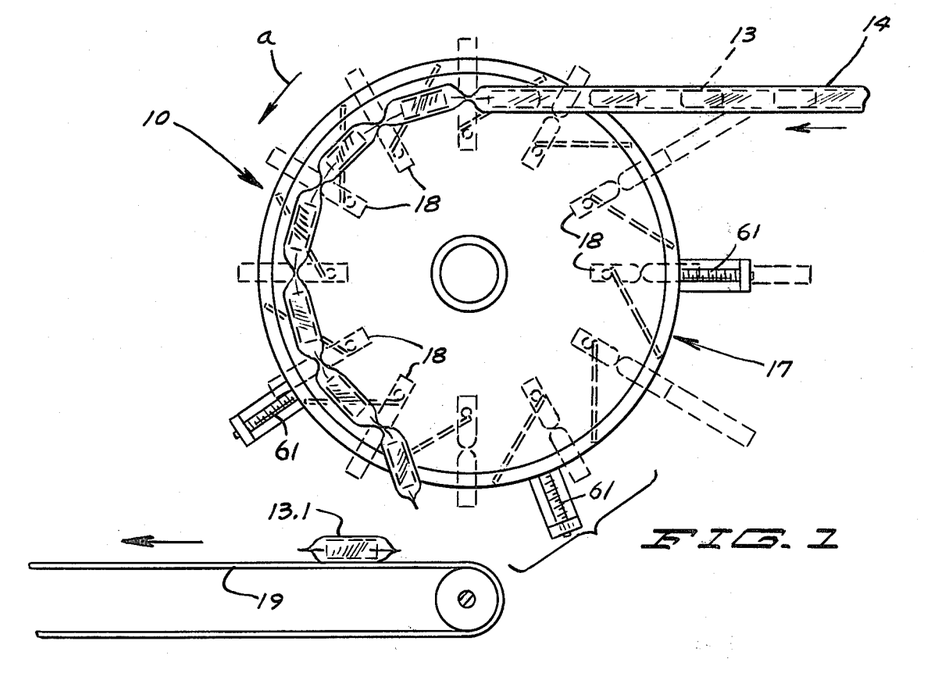
FIGS. 1, 2 and 3 are diagrammatic elevation views illustrating three significantly different operating modes of the present invention for handling packages of a wide variety of sizes.
Figure 2:
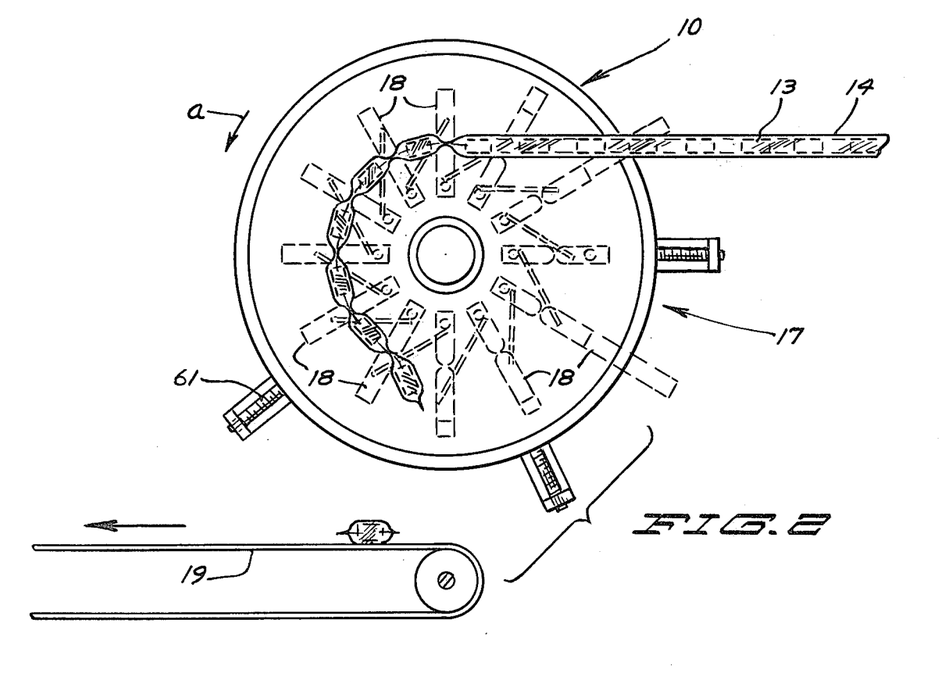
Figure 3:
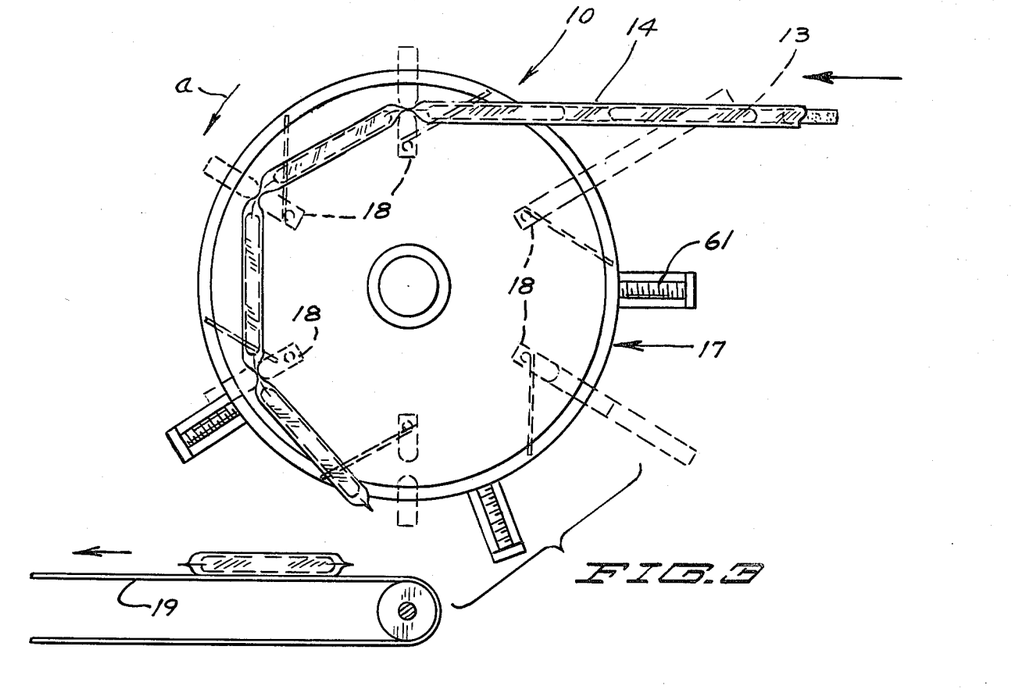
Figure 4:
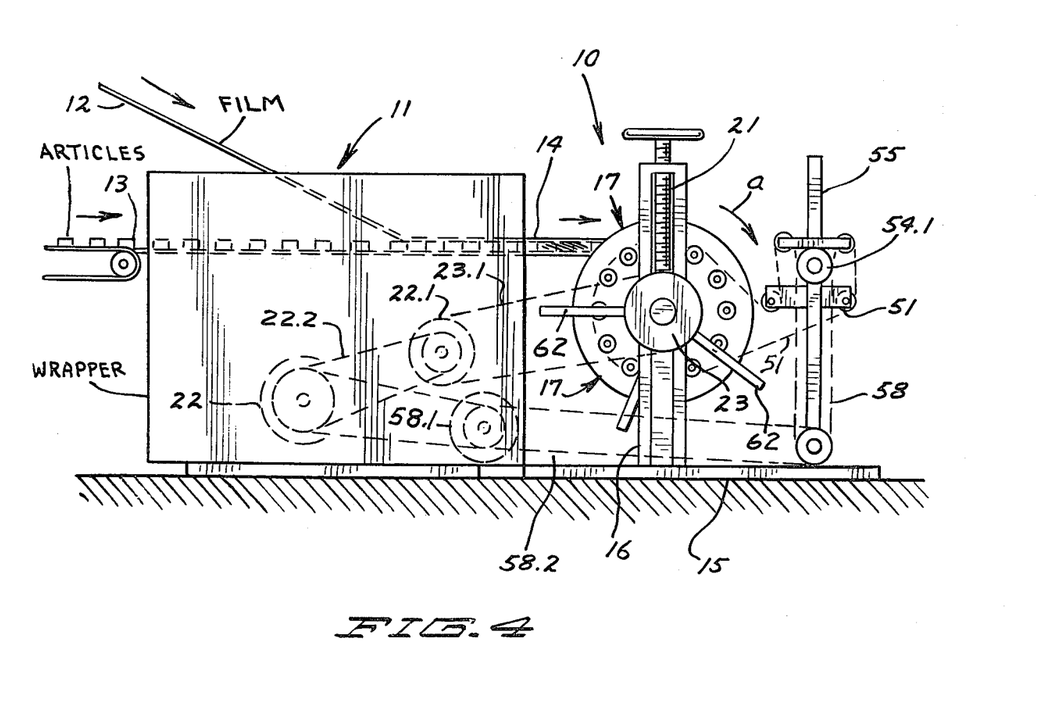
FIG. 4 is a diagrammatic elevation view of the wrapper and sealing and cutoff machine and viewed from the rear in order to illustrate general relationships of the drives and main mechanisms.

The package forming and sealing machine is indicated in general by numeral 10 and is to be used in conjunction with a wrapper 11 of a type known to persons of skill in the art, and of the type which receives a strip of heat sealable film 12 and also receives a succession of articles 13, and forms the film 12 into a tubular wrapper 14 which embraces and confines the series of articles 13 and maintains the articles in spaced relation with each other. The articles 13 may vary considerably in shape and size. Such articles may be relatively short, as illustrated in FIG. 2, or relatively long, as illustrated in FIG. 3, or of an intermediate length, as illustrated in FIG. 1. In all events, the articles are spaced from each other within the tubular wrapper 14. It will be recognized that the tubular wrapper 14 is formed with the side edges of the strip of film material sealed to each other so that the tubular wrapper is permanently tubular.

The package forming and sealing machine 10 has a base 15 and a pedestal 16 in fixed relation to the frame of the wrapper 11 so as to receive the conveyed article-confining tubular wrapper 14 from the discharge end of the wrapper 11.

A rotor, indicated in general by numeral 17, is carried on the pedestal 16 and has a multiplicity of sealng and cutoff heads 18 regularly spaced around the periphery thereof. The heads 18 accomplish the function of first closing the wrapper 14 between the adjacent articles 13 confined therein, gripping the wrapper tightly, severing the wrapper between adjacent articles, sealing the ends of the wrapper after the wrapper has been severed, and subsequently releasing the formed and sealed packages and allowing them to drop onto a conveyor 19 to be carried away.

In FIGS. 1 and 2, it will be evident that the sealing and cutoff heads 18 may be radially adjusted toward and away from the axis of the rotor 17 which revolves in the direction of arrow a. It will be recognized that, in FIG. 1, the heads 18 have been located in widely spaced relation with respect to the rotor axis; and in FIG. 2, the heads 18 have been adjusted inwardly to a position closely adjacent the rotor axis. The radial adjustability of the heads 18 changes the distance in a direction circumferentially of the rotor 17, between the gripping jaw faces of adjacent heads. Accordingly, it will be seen that, in FIG. 2 where the heads 18 have been located closely adjacent the rotor axis, the circumferential distance between adjacent heads is relatively small; and in FIG. 1, the circumferential distance between adjacent heads 18 is significantly larger than in FIG. 2 so as to accommodate larger packages containing larger articles.

In FIG. 3, still larger packages are accommodated, as compared to FIG. 1, because in FIG. 3, the heads 18 have been adjusted radially outwardly to a maximum extent on the rotor 17, and the number of heads 18 has been reduced. By eliminating every second head found in FIG. 1, the resultant rotor and head spacing illustrated in FIG. 3 produces a significantly longer circumferential distance between the jaw faces of adjacent heads 18. Significantly longer articles can be accommodated and significantly larger packages can be formed in the arrangement of FIG. 3.

The rotor 17 is illustrated in significantly more detail in FIGS. 5-8.

Figure 8:
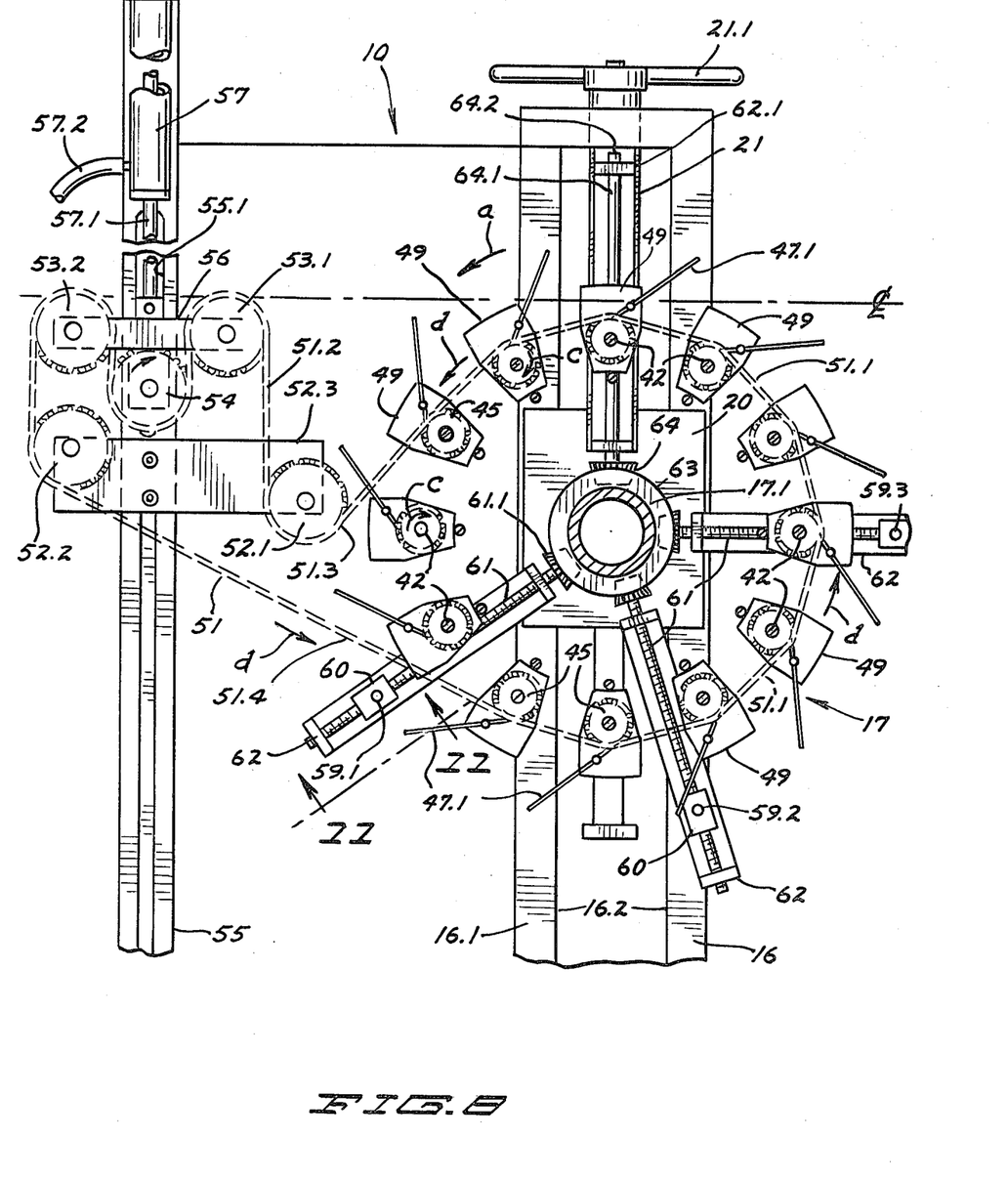
FIG. 8 is a detail section view taken approximately at 8—8 of FIG. 6.

The pedestal 16 is seen in FIG. 8, and includes a pair of spaced and parallel upright frame members 16.1 having inner sides 16.2 defining a guideway, along which bearing block 20 is guided for vertical adjustment. The bearing block 20 is suspended and adjustably mounted in the guideway of pedestal 16 by a vertical screw 21 threaded into the bearing block 20 and rotatably mounted at the top of the pedestal 16 for rotation by manually turning the hand wheel 21.1 attached at the top end of the screw. The screw 21 accommodates limited vertical adjustment of the bearing block 20.

The bearing block 20 rotatably mounts a main shaft 17.1 of the rotor which carries all of the sealing and cutting heads 18 and produces revolving thereof.

The main shaft 17 receives rotary motion from the wrapper 11 so as to coordinate the rotational speed of the rotor with the rate of travel of the article-containing sheet material wrapper 14 being received by the rotor. More specifically, a source of rotary motion or motor 22 is connected with a variable speed drive 22.1 by a chain 22.2, and the variable speed drive 22.1 is connected to a sprocket 23 affixed on the main rotor shaft 17.1 by a chain 23.1.

Rotor 17 includes a rigid collar plate 24 affixed to the main shaft 17.1.

A substantially annular head-mounting plate 25 is affixed as by bolts 25.1 to the collar 24 for mounting the heads 18.

Figure 5:
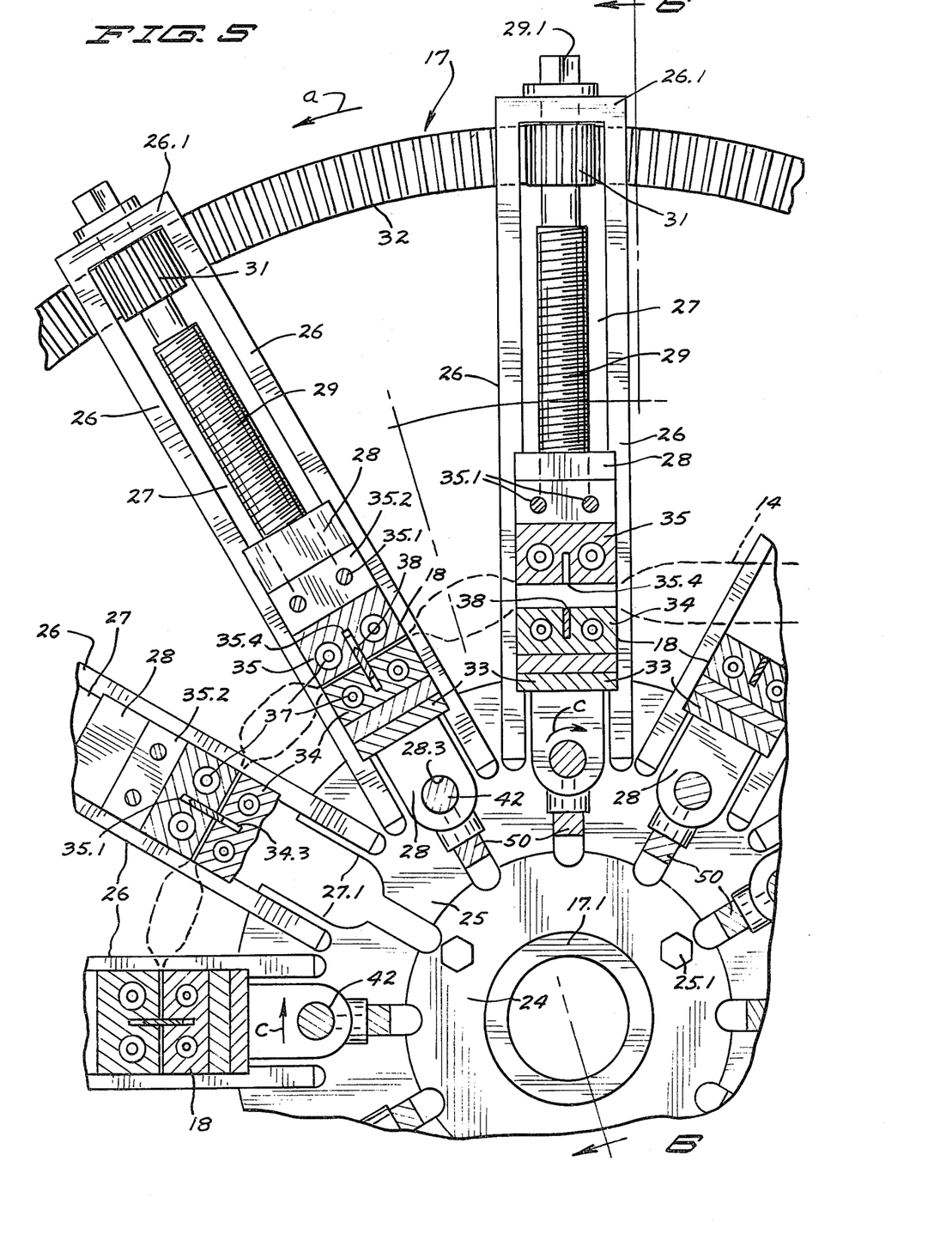
FIG. 5 is a greatly enlarged detail section view taken approximately at 5—5 of FIG. 6 and illustrating a section of the rotor and several sealing and cutoff heads.

The mounting plate 25 has a multiplicity of radially outwardly extending guide bars 26 affixed thereto as by welding so as to define a multiplicity of guideways 27 or guide channels extending radially outwardly from the mounting plate 25. As seen in FIG. 5, the outer periphery of the guide plate 25 is also provided with recesses 27.1 which constitute extensions of the guideways 27.

Figures 6, 6A:
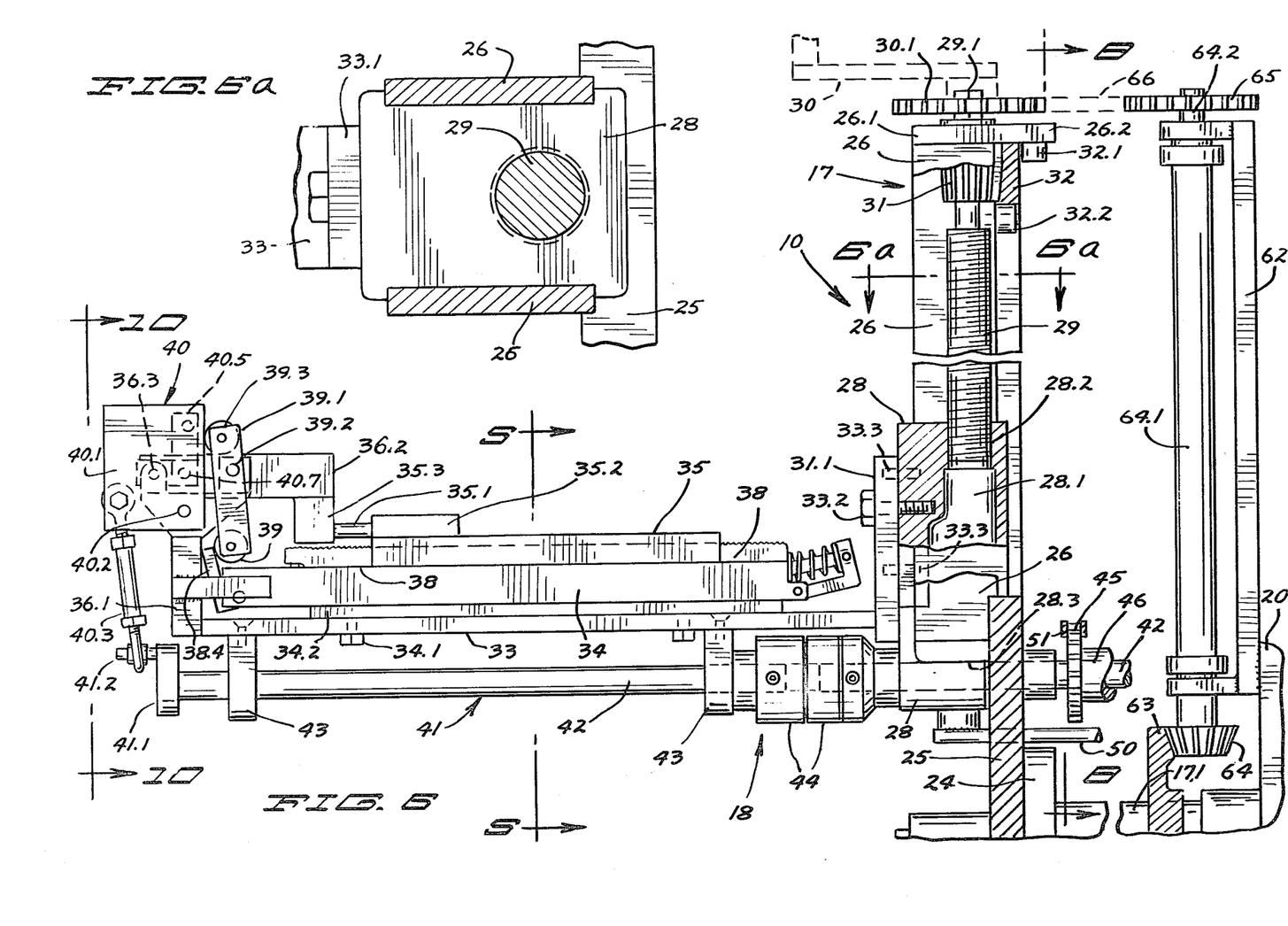
FIG. 6 is a detail section view taken approximately at 6—6 of FIG. 5 with portions thereof broken away for clarity of detail.
FIG. 6a is an enlarged detail section view taken at 6a—6a of FIG. 6.

Each of the heads 18 has a mounting block 28 slidably mounted in a respective guideway 27 and guided in radial movement of the rotor 17 by the guide bars 26. The outer transverse ends 26.1 of the guide bars 26 provide rotary mountings for the threaded rods or screws 29 which extend radially of the rotor in the several guideways 27. The screws 29 are threadably connected into the head-mounting blocks 28 as illustrated in FIG. 6, so that turning of the screws 29 produces radial movement of the adjacent head-mounting block. The head-mounting blocks 28 have open interiors 28.1 adjacent the threaded openings 28.2, for receiving the screw 29 as the head-mounting block is moved radially outwardly away from the shaft 17.1.

Each of the threaded shafts 29 has a squared end 29.1 disposed outwardly of the transverse end 26.1 of the guide bars so that a socketed crank 30 may be applied thereto to accomplish turning of the threaded rod. Also, the squared end 29.1 will receive a removable sprocket 30.1 having a square center hole so as to be non-rotatable on the squared end 29.1 for purposes hereinafter made apparent.

Each of the threaded rods 29 also has a beveled pinion gear 31 affixed thereon, immediately adjacent the transverse outer end 26.1 of the guide bars 26.

A ring gear 32 extends around the entire periphery of rotor 17 and is meshed with all of the pinion gears 31 of all of the threaded rods 29. The ring gear 32 is maintained in meshed relation with the several pinions 31 by guide rollers 32.1 which are located on rearwardly extending lips 26.2 of the several transverse ends 26.1 of the guide bars 26. The rollers 32.1 roll along the rear smooth annular face of the ring gear 32 and maintain the ring gear firmly against the pinions 31 so that all of the pinions 31 must revolve simultaneously as the ring gear 32 revolves about the axis of rotor 17 and shaft 17.1. Additional guide rollers 32.2 are mounted on the radial guide bars 26 for stabilizing the ring gear 32 in its travel.

It will be recognized that when a socketed crank 30 is applied to the squared end of one of the threaded rods 29, the pinion 31 will be revolved with the threaded rod 29. The threads on the threaded rod 29 cause the head-mounting block 28 to move radially with respect to the rotor axis; and the pinion gear will cause the ring gear 32 to commence travel about the outer periphery of the rotor. Travel of the ring gear 32 simultaneously causes turning of all of the pinions 31 on all of the threaded rods 29 so that all of the mounting blocks 28 of all of the sealing and cutting heads 18 will simultaneously move radially of the rotor and in the same radial direction.

Each of the heads 18 includes, in addition to the mounting block 28, a cantilever frame 33, a stationary jaw 34, and a swingable jaw 35. Each of the cantilever frames has a mounting plate 33.1 affixed to the frame 33 as by welding, and lying against the mounting block 28. The frame mounting plate 33.1 is affixed to the mounting block 28 by a cap screw 33.2 and is maintained in desired orientation by a pair of positioning pins 33.3 which extend into accurately located holes in the plate 33.1 and in the mounting block 28.

The stationary or lower jaw 34 is affixed onto the cantilever frame by mounting bolts 34.1, and is maintained in spaced relation with the cantilever frame by a heat insulating spacer block 34.2.

The swinging or upper jaw 35 is mounted on the cantilever frame by a pair of cooperating hinge parts 36.1 and 36.2, which are swingably connected with each other by hinge pin 36.3. The stationary hinge part 36.1 is affixed to the cantilever frame as by countersunk screws so as to form an effective extension of the cantilever frame.

The swingable hinge part 36.2 is connected to the top swingable jaw 35 by a pair of parallel spring rods 35.1 which lie along the top surface of the jaw 35 and which are affixed thereto. Terminal fittings 35.2 and 35.3 are affixed as by clamping to opposite ends of the spring rods 35.1 and are affixed as by countersunk screws to the swingable jaw 35 and to the hinge part 36.2.

Both the stationary and movable jaws 34 and 35 are provided with electric resistance heating elements 37 to provide sealing heat for the wrapper 14.

Figure 7:
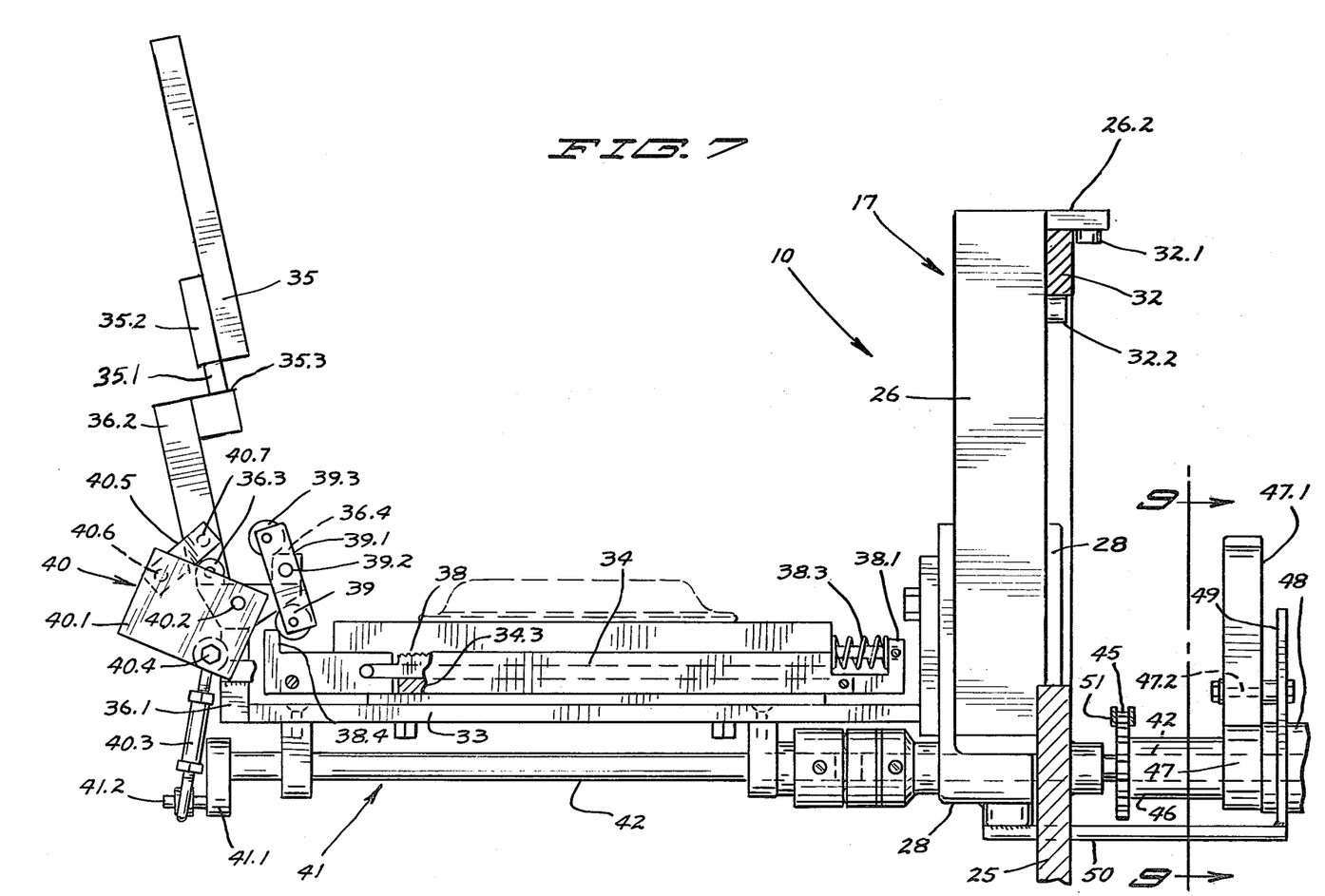
FIG. 7 is a detail section view comparable to FIG. 6, but showing the sealing jaw in fully opened position.

The lower and upper jaws 34 and 35 also have aligned slots 34.3 and 35.4, which extend longitudinally throughout substantially the entire lengths of the jaws for receiving knife blade 38. Normally, the knife blade is confined wholly within the slot 34.3 of the lower stationary jaw, as seen in FIG. 7. The opposite ends of the knife blade 38 are connected to L-shaped fittings 38.1 and 38.2 respectively, both of which are pivoted to the lower jaw 34 and lie partially within enlarged portions of the blade slot 34.3. A compression spring 38.3 bears against the lower jaw 34 and against the L-shaped mounting 38.1 for the purpose of returning the blade 38 into the blade slot 34.3 of the lower jaw.

The L-shaped mounting 38.2 has a cam arm 38.4 which bears against a cam roller 39, to be operated thereby in response to full closing of the swingable jaw 35 onto the face of the stationary jaw 34.

The camming roller 39 is rotatably mounted on a rocker arm or lever 39.1 which is tiltably mounted on a pin 39.2 secured to an upright ear 36.4 which is formed integrally of the stationary hinge part 36.1. The rocker arm 39.1 also carries a cam follower roller 39.3 at the end opposite roller 39.

The swingable jaw 35 is swung between closed and open position by a linkage 40 which is operated by a source of rotary power 41 terminating in a rotary crank arm 41.1 which swings the linkage 40 between the two positions illustrated in FIGS. 6 and 7.

The linkage 40 includes a pair of operating links 40.1, swingably mounted on the stationary hinge part 36.1 by a pivot pin 40.2.

The operating links 40.1 are connected to the crank arm 41.1 by a drive link 40.3 swively connected at its opposite ends to the drive pin 41.2 on the crank arm 41.1, and a connecting pin 40.4 which is affixed to and spans between the operating links 40.1.

A pair of connecting links 40.5 are provided for connecting the two operating links 40.1 to the swingable hinge part 36.2 of the upper jaw. Opposite ends of the connecting link 40.5 are respectively pivotally connected to the operating links 40.1 and to the hinge part 36.2 by connecting pins 40.6 and 40.7, respectively. In FIG. 6, it will be recognized that the three pivot pins 40.6, 40.7 and 40.2 are in substantial alignment when the swingable top jaw 35 is closed against the stationary lower jaw 34. However, the alignment of the centers of these three pivots is not precise in this position but an over-center relationship is established as to effectively lock the swingable upper jaw 35 against the stationary lower jaw 34 until the operating links 40.1 are intentionally swung downwardly away from the position illustrated in FIG. 6.

The roller 39.3 lies in the same plane as one of the operating links 40.1 as to be engaged by the side edge thereof as the operating link 40.1 is swung to the position illustrated in FIG. 6, whereby the rocker arm 39.1 and the roller 39 are moved to cause the blade 38 to be projected out of the lower jaw 35 and to cut the sheet material of the wrapper and project into the upper jaw 35.

The rotary drive 41 includes a rotatable shaft 42 journaled in a pair of stationary bearings 43 affixed as by countersunk screws to the cantilever frame 33.

The shaft 42 has an overload clutch 44 interposed between endwise aligned sections of shaft 42, and the shaft 42 is also carried in a bearing aperture 28.3 of the head mounting block 28. It will be recognized that the shaft 42 extends endwise through the plane of the mounting plate 25, and through either the recess 27.1 in the mounting plate or through the guideway 27 between a pair of adjacent guide bars 26, depending upon the position of the respective head 18.

The rotary drive shaft 42 of each of the sealing and cutting heads 18 receives rotary power from a drive sprocket 45 which is concentric therewith. The drive sprocket 45 is affixed to a tubular drive shaft 26 concentric of shaft 42 and forming the input for a rotary clutch 47 which transmits rotary power from the tubular drive shaft 46 to a brake 48, from which the rotary power is transmitted into the drive shaft 42. The clutch 47 and brake 48 are both concentric of shaft 42 and are respectively carried on a mounting panel 49 which is affixed upon a post 50 affixed as by countersunk screws to the head mounting block 28. It will be seen that the post 50 protrudes through the annular mounting plate 25 in the recess 27.1, or when the heads are disposed in radially outwardly shifted position, the post 50 will extend thorugh the guideway 27.

The source of rotary power 41 of each of the heads 18 includes a trip arm 47.1 which operates with the clutch 47 to retain the output cylinder of the clutch by engaging the clutch in one of the notches 47a, 47b and 47c. The trip arm 47.1 is tiltably mounted on a pivot 47.2 which is affixed upon the mounting panel 49. A bias spring 47.3 engages the trip arm 47.1 and is anchored on the panel 49 as to normally bias the pawl end 47.4 of the trip arm into the several notches 47a, 47b and 47c. Notches 47a, 47,i b and 47c respectively conform to 0° (top dead center), 60° and 180° cycle positions of the shaft 42 and crankarm 41.

Figures 9, 10, 11:
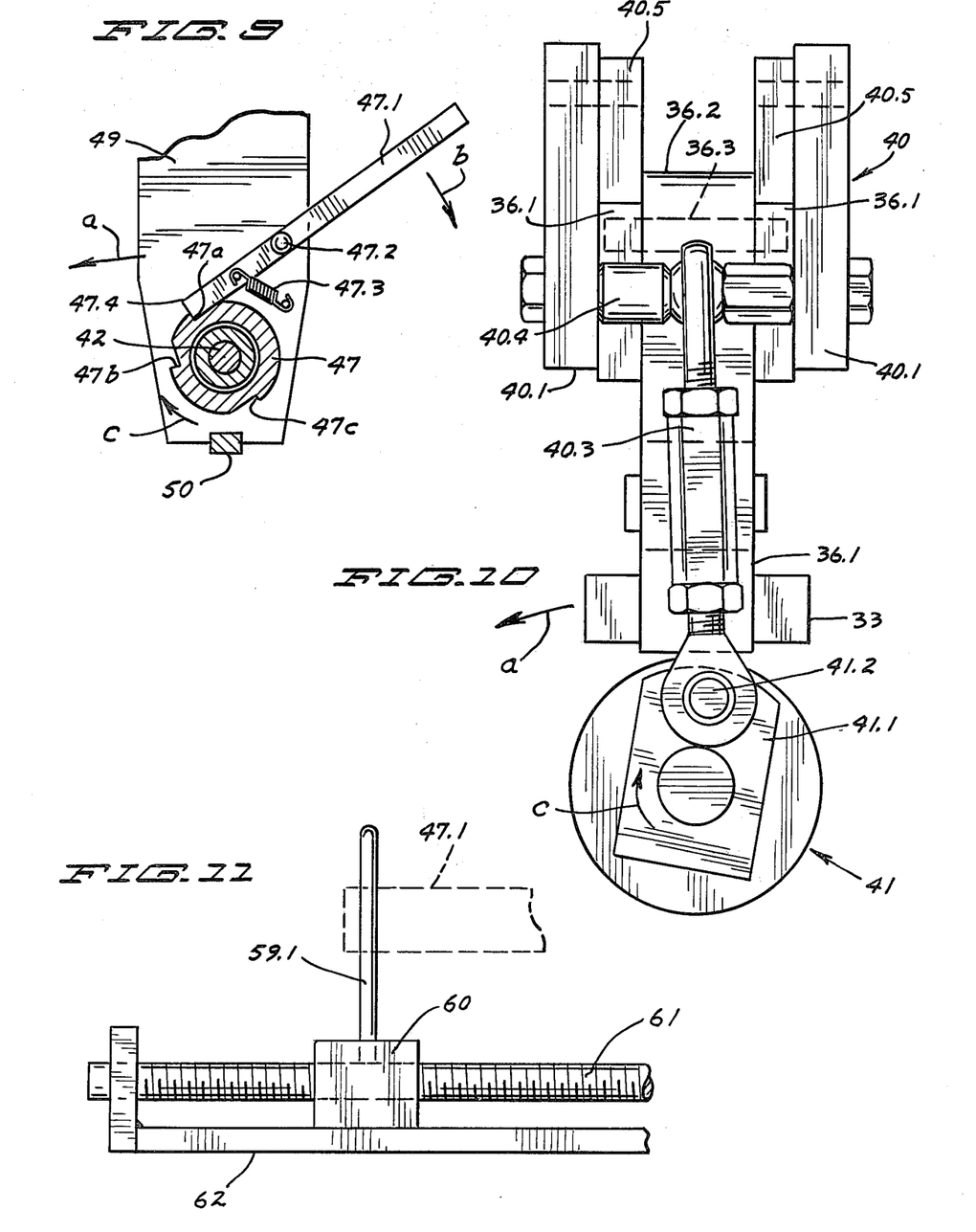
FIG. 9 is a detail section view taken approximately at 9—9 of FIG. 7.
FIG. 10 is a detail elevation view taken approximately at 10—10 of FIG. 6.
FIG. 11 is an enlarged detail elevation view taken approximately at 11—11 in FIG. 8.

As seen in FIG. 9, as the trip arm 47.1 is tilted in the direction of arrow b, the output of clutch 47 is released so as to allow power to be transmitted from sprocket 45 to the shaft 42, until the shaft and clutch have turned through approximately 60°, whereupon the trip arm 47.1 will again drop into notch 47b to again stop the clutch output and shaft 42 at a new position. Subsequently, when the trip arm 47.1 is tilted momentarily again, the clutch 47 and the shaft 42 are released as to again permit rotation of the shaft 42 through an angle of approximately 120°, until the pawl 47.4 of the trip arm engages into the notch 47c whereupon the clutch and shaft are again stopped. When the trip arm 47.1 is again momentarily tilted, the clutch and shaft are released to turn approximately 180° until the pawl 47.4 again drops into notch 47a.

As a result of this intermittent motion of the shaft 42, the swingable jaw 35 is held in closed position when the pawl 47.4 is retained in the notch 47a; the jaw 35 is released and allowed to open slightly when the trip arm is initially released and then subsequently retained in the notch 47b, and at the this time, the jaw 35 is held in partly opened position; and when the trip arm is again tilted, the clutch 47 and shaft 42 are allowed to turn for swinging the jaw 35 to full open position until the pawl 47.4 comes to rest in the notch 47c, whereupon at this position of shaft 42, the swingable jaw is retained in its full open position; and finally, as the trip arm 47.1 is tilted out of engagement with the clutch 47 and notch 47c as to allow rotation of the clutch 47 and shaft 42 back to the top dead center position, the swingable jaw 35 is swung between full open and fully closed position, and at the end of this swinging of the jaw 35, the pawl 47.4 of the trip arm will again come to rest in the notch 47a of the clutch.

Means are provided for revolving the sprockets 45 on their own axes as the rotor 17 revolves with shaft 17.1 and drive sprocket 23.

An endless roller chain 51 has a loop 51.1 extending around the periphery of the rotor 17 and embracing the sprockets 45 of the several heads 18. The loop 51.1 of the chain is engaged and meshed with substantially all of the sprockets 45, and as the rotor 17 revolves, the sprockets 45 roll along the chain 51 so as to supply rotary power to the shafts 42 as the clutches 47 are sequentially released.

A take-up bight 51.2 of the chain is disposed adjacent, but at one side of rotor 17, and is trained over a pair of stationary guide sprockets 52.1 and 52.2, a pair of take-up sprockets 53.1 and 53.2 and a driving sprocket 54. The guide sprockets 52.1 are both journaled on a stationary crossarm 52.3 affixed on an upright standard 55 which is affixed to the stationary base 15. The guide sprockets 52.1 and 52.2 respectively locate connecting portions 51.3 and 51.4 of the chain which interconnect the loop 51.1 with the take-up bight 51.2. It will be recognized that as the rotor 17 revolves in the direction of arrow a, the sprockets 45 disengage from chain 51 at the connecting portion 51.3 and then the sprockets travel across to the other connecting portion 51.4 whereupon the sprocket is again reengaged to the chain and continues around the loop 51.1.

Take-up sprockets 53.1 and 53.2, and the drive sprocket 54 are all journaled on a slidable crosshead 56 which is guided in a slot-shaped guideway 55.1 in the standard 55. The crosshead 56 is movable upwardly and downwardly on the standard 55 to keep the linear runs of the take-up bight 51.2 tight and to thereby keep the loop 51.1 tightly embraced around the sprockets 45.

An air cylinder 47 is mounted on the upper end of the standard 55, and has its piston rod 57.1 connected to the crosshead 56, and the air connection 57.2 to the cylinder continuously applies air pressure on the piston to apply biasing upward pressure on the crosshead 56 for maintaining the chain 51 tight.

The drive sprocket 54 is on a shaft which extends through a bearing on the crosshead 56 and is connected to a power sprocket 54.1 on the other side of the standard which receives power from variable speed power unit 58.1 through drive chains 58 and 58.2. The variable speed power unit 58.1 receives its power from the motor 22. Speed of the driving sprocket 54 and of the chain 51 may thereby coordinated with the rotary speed of rotor 17.

Normally, the sprockets 45 will roll along the chain 51 and be revolved in the direction of arrow c to turn the shaft 42 and crankarm 41.1 in the same direction. If the chain 51 were allowed to remain stationary, the rate of turning of the sprockets 45 and of shaft 42 would be excessive, and accordingly, the chain 51 is driven in the direction of arrow d at a rate somewhat less than the linear rate of the periphery of the rotor 17 so as to significantly slow down the turning of sprockets 45 and shaft 42 as compared to the speed at which the sprockets 45 would revolve if the chain 51 were stationary. The variable speed drive 58.1 will be adjusted to set the speed of chain 51 at the desired speed; and the speed of chain 51 will be adjusted when the heads 18 are shifted inwardly from the position illustrated in FIG. 1 to the position illustrated in FIG. 2.

A plurality of stop cams 59.1, 59.2 and 59.3 are nonrotatably supported from the pedestal 16 for the purpose of engaging and tilting the trip arms 47.1 as the rotor 17 revolves and to tip the pawls of the trip arms out of the notches 47a, 47b and 47c of the clutch 47 so as to allow the sprockets 45 to drive the shafts 42 at predetermined phases of the operating cycle. The stop cams 59.1, 59.2 and 59.3 comprise elongate rods extending horizontally and parallel to the rotor axis and traversing the paths of the trip arms 47.1 as the arms revolve with the rotor. The stop cams are mounted on nuts 60 which are carried on screws 61 journaled on and guided along radially extending guide frames 62 which are affixed by bolts on the bearing block 20 supported on pedestal 16. The screws 61 have bevel gears 61.1 meshed with ring gear 63 which is concentric of the rotor shaft 17.1, but which is free to revolve independently of the rotor shaft. Normally the ring gear 63 remains stationary, but when revolved, will turn all of the bevel gears 61.1 to turn the screws 61 and relocate the nuts 60 and their stop cams 59.1 and 59.2 and 59.3 thereon.

Turning of the ring gear 63 is controlled by a bevel gear 64 which is meshed with the ring gear 63 and is mounted on a vertical control shaft 64.1 which is journaled in a vertical, radially extending frame 62.1, also affixed by bolts to the mounting block 20 on pedestal 16. The upper end of shaft 64.1 has a squared end 64.2, upon which an auxiliary sprocket 65 may be mounted for applying rotary power to the shaft 64.1, thereby simultaneously adjusting the radial position of all of the stop cams 59.1, 59.2 and 59.3.

It will be seen in FIG. 6, that when one of the heads 18 is stopped in precisely upright position so that the threaded shaft 29 is vertical and parallel to the shaft 64.1, the sprockets 30.1 and 65 are interconnected by a roller chain 66 so that when the crank 30 is revolved, the threaded shafts 29 will all be turned simultaneously through the action of ring gear 32, and the threaded shafts 61 will all be turned at the same rate and simultaneously through the action of ring gear 63 so that all of the stop cams 59.1, 59.2 and 59.3 are simultaneously adjusted in the radial direction at the same rate and to the same extent as all of the heads 58 and particularly as the mounting blocks 28 thereof are moved radially along the threaded shafts 29. The same relationship is thereby maintained between the several stop cams 59.1, 59.2 and 59.3, and the outer ends of the trip arms 47.1 which are operated thereby.

It will be recognized that the tubular wrapper 14 continuously emerges from the wrapper 11 at the same vertical position from the base. If the articles being packaged are small, as illustrated in FIG. 2, so that the heads 18 are shifted closely adjacent the center of the rotor 17, the rotor will necessarily be elevated on the pedestal 16 by turning the hand wheel 21.1 and screw 21 so as to raise the rotor. Under this circumstance, the bight 51.2 of chain 51 will be larger because all of the sprockets 45 are closer to the center of the rotor, and the loop 51.1 in the chain will have a significantly smaller circumferential dimension.

In operation, from the foregoing, it will be clear that the changeover from forming small packages as illustrated in FIG. 2 to the forming of larger packages as illustrated in FIG. 1 is a rather simple operation. With the rotor 17 positioned so that one of the threaded rods 29 is in vertical position, immediately opposite the control shaft 64.1, the crank is applied and operated so as to simultaneously turn the threaded rod 29 and shaft 64.1, thereby simultaneously adjusting the radial position of all of the heads 18 and simultaneously and correspondingly adjusting the radial positions of the several stop cams 59.1, 59.2 and 59.3.

After this adjustment is quickly made, a new production run may be started to accommodate packages of a different size.

In order to accommodate larger size packages than those indicated in FIG. 1, six of the twelve sealing and cutting heads 18 will be removed. The removal of the heads 18 is a simple operation and can be quickly accomplished. Removal of one of the heads 18 is accomplished simply by removing the mounting screw 33.2 which demounts the cantilever frame 33 from the mounting block 28. Shaft 42 will be demounted at the overload clutch 44, whereupon the rotor 17 will again be prepared for forming larger packages as illustrated in FIG. 3. It may be necessary to slightly adjust the radial position of the remaining heads 18, and correspondingly to adjust the radial position of the stop cams 59.1, 59.2 and 59.3 in the manner previously described so as to accurately locate the heads 18 to accommodate packages of the desired size.

An operational cycle of each of the heads 18 may be considered to commence as the head closes onto the incoming wrapper 14. The actual phase position for closing the head onto the wrapper may be varied, as hereinafter described, but in a typical cycle, the vertical position of a head 18 is considered to be the 0° phase position of the operational cycle. At the 0° position of such a cycle, the wrapper 14 lays across the stationary jaw 34 and the swingable jaw 35 and is not yet fully closed onto the wrapper and stationary jaw. The knife blade 48 is fully retracted at this position. The swingable jaw 35 is rapidly swinging toward the stationary lower jaw under the influence of the turning of shaft 42 and crankarm 41 which is rapidly moving toward TDC (top dead center).

At approximately the 15° phase position of head 18, the top jaw 35 has closed tightly onto the lower jaw 34 and the knife 38 has commenced moving out of the lower jaw for cutting the wrapper which has been clamped between the jaws; the crankarm 41.1 is completing its turning and is approaching TDC position; and the linkage 40 is completing its movement to over center position for locking swingable jaw 35 in closed position.

When the head 18 reaches the 30° phase position, the crankarm 41.1 will have reached and stopped at the TDC position because the pawl 47.4 will have dropped into the notch 47a and stopped rotation of shaft 42; and the knife 38 will have completed cutting of the wrapper and the linkage 40 will have completed shifting to over center locked up position; and spring rods 35.1 will have flexed slightly to prevent the application of excessive pressure onto the top jaw 35.

As the rotor 17 continuously revolves, the head will continue to apply sealing pressure and heat to the wrapper. However, approximately at the 60° phase position, the sprocket 45 of the head will release from the connecting portion 51.3 of chain 51, but the swingable jaw 35 continues to clamp the wrapper because the over center linkage 40 continues to hold the jaw 35 in its fixed position, and the brake 48 holds the shaft 42 from turning even though sprocket 45 has released from the chain.

At approximately the 120° phase position of head 18, its crankarm 41.1 remains at the TDC position, but the sprocket 45 again picks up the chain 51 at the other connecting portion 51.4 thereof, and the sprocket starts turning again. However, rotation of the sprocket is not transmitted at this moment to the shaft 42.

At approximately the 150° phase position of head 18, the sealing of the wrapper is substantially completed and the swingable head 35 will commence to open to release the severed package. At this position, the trip arm 47.1 engages the stop cam 59.1 and is tilted thereby so as to release the clutch and allow the sprocket 45, which is rolling along chain 51, to commence turning the shaft 42. Turning of the crankarm 41.1 away from TDC position releases the over center linkage 40 and opening of jaw 35 is commenced.

As the head approaches the 210° phase position, the swingable jaw 35 will have swung away from the stationary jaw to an angle of approximately 8° to 10°, which is sufficient to release the package 13.1 and allow the package to fall onto the conveyor 19. At approximately the 210° phase position of the head 18, the crankarm 41.1 will have reached approximately its 60° position and the pawl 47.4 will drop into the notch 47b to stop the turning of shaft 42, whereupon the opening of jaw 35 is stopped.

Of course, the sprocket 45 continues to roll on the chain.

Continued turning of the rotor carries the head 18 to approximately the 230° phase position, whereupon the trip arm 47.1 engages and is tilted by the stop cam 59.2 to again engage the clutch 47 and commence turning of shaft 42 and crankarm 41.1. At this time, the swingable jaw 35 commences swinging again under influence of the operating linkage 40 so as to swing the jaw 35 toward its full open position. The shaft 42 and crankarm 41.1 revolve through approximately 120°, whereupon the shaft 42 is stopped when the pawl 47.4 drops into the notch 47c.

The opening of the top jaw 35 is completed as the head 18 approaches the 280° phase position. It is approximately at this moment that turning of shaft 42 and crankarm 41.1 stops.

When the head 18 reaches the 300° phase position, the clutch 47 is again engaged by trip arm 47.1 tilting under the influence of the stop cam 59.3, whereupon the pawl 47.4 releases from the notch 47c and allows the turning of sprocket 45 to turn shaft 42 and crankarm 41.1. Action of the linkage 40 again commences the closing of jaw 35 onto the stationary jaw 34.

As the swinging jaw 35 commences its inward swinging movement about pivot 36.3, the swinging of the jaw 35 must be timed as to clear the incoming tubular wrapper 14, and to avoid premature engagement with the wrapper 14. In this phase of operation, the shaft 42 and crankarm 14.1 are permitted to turn through a full 180° so as to return toward the TDC position.

As indicated above, the head 18 will pass by the 0° phase position and the swinging jaw 35 is still moving toward the stationary jaw, but clamping of the wrapper 14 is commenced as illustrated in FIG. 5.

The phase position at which the swingable jaw 35 initially grips and starts sealing the wrapper 14 may be changed considerably by changing the speed of travel of the chain 51. The change of speed may be effected by changing the output speed of the variable speed drive unit 58.1. It is possible to cause the swingable jaw 35 to clamp tight onto the wrapper at a 345° phase position, which is prior to the time the head 18 has attained the vertical 0° position. As a result, the dwell time is lengthened, during which sealing head is applied by the jaws 34 and 35 to the wrapper. By judiciously adjusting the speed of chain 51 the dwell time may be significantly varied.

The sealing apparatus 10 will handle a wide range of package sizes between four inches and 12 inches in length. Building the rotor 17 larger would permit handling of packages of considerably larger size than those indicated. Packages may be formed at the rate of fifty or seventy-five packages per minute for twelve inch long packages, or approximately one hundred fifty packages per minute may be formed with four inch long packages. Under varying circumstances, depending upon the time necessary for making an efficient seal in the wrapper 14, the production output of the sealing apparatus 10 may vary extremely widely. Wrapping machines 11 may be capable of producing up to 1600 inches of wrapper 14 per minute, and depending upon the nature of the articles being wrapped and the type of film being used, the sealing apparatus 10 will be able to accommodate the output of the wrapping machine 11.

It will be seen that the sealing apparatus 10 accommodates the improved method of forming and sealing packages from a longitudianally traveling wrapper of sheet material confining articles therein, including gripping, sealing and cutting the wrapper between adjacent articles and with sets of jaws traveling in a circular path and releasing the cut and sealed article-containing packages after the sets of jaws have carried the wrapper through a significant arc of the circular path, and accommodating the forming of packages of different sizes by simultaneously moving all of the sets of jaws radially of the circular path to change the linear span between the adjacent jaws sets.

FIGS. 12–16 illustrate another mode of operating the package forming and sealing machine 10. In this situation, the rotor 17 is oriented horizontally so that the central shaft 17.1 extends vertically and revolves about the vertical axis 17.11. In this arrangement, the 0° phase position of the rotor is located approximately as designated at the letter P. At this location, the film wrapper 14.1 is initially clamped and sealed closed by a head 18 passing this position. In this mode of operating the machine 10, the blade 38 is entirely removed from each of the heads 18, because the film is not to be cut until the sealing is entirely complete. The film 14.1 is folded into the position illustrated in FIG. 14 as it enters the first head of the rotor. It will be recognized that the film is being drawn off a roll 14.11. The succession of sealing heads 18 clamping the film at spaced locations along the length thereof produce a number of pouches 14.12 which have open upper edges 14.13. After the pouches have been sealed shut, the swingable jaws of the heads progressively open at approximately the 180° phase position indicated by the letter P' so that the succession of pouches 14.2 which are all connected together are drawn off the rotor 17.

Figures 12, 13, 14, 15, 16:
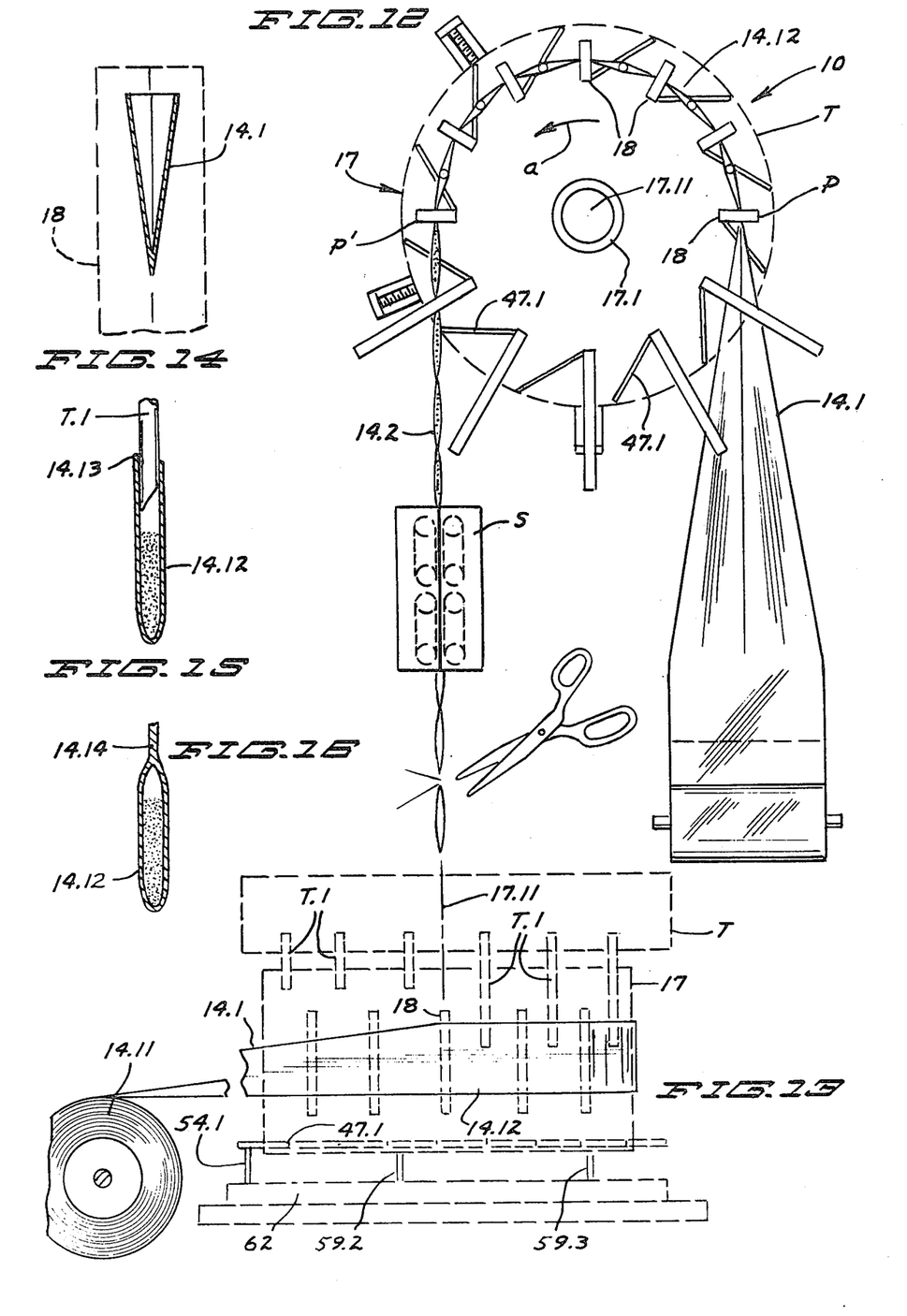
FIG. 12 is a diagrammatic plan view showing the rotor oriented horizontally and revolving about a vertical axis.
FIG. 13 is a diagrammatic elevation view showing principal aspects of the rotor of FIG. 12 which is oriented horizontally and revolving about a vertical axis.
FIG. 14 is a section view through the film as it approaches the rotor in FIG. 12.
FIG. 15 is a detail section view of one of the film pouches being filled as the pouch revolves with the rotor.
FIG. 16 is a detail section through one of the pouches after the upper edge has been sealed.

In the condition illustrated in FIG. 12, the pouches 14.2 immediately pass through a horizontal sealer S for the purpose of sealing together the upper edges as illustrated at 14.14 in FIG. 16. At this time, after the seal is effected, the pouch 14.13 is entirely enclosed and may be cut from the strip after it has exited the sealer S.

The horizontally oriented rotor 17 has the same trip arms 47.1 as illustrated in FIGS. 1–11; and the rotor 17 is in superposed relation with the stop cams 59.1, 59.2 and 59.3 for operating the trip arms and causing the swingable jaws of the heads to open and close as previously described.

It may be desirable, under certain circumstances, to provide for filling the pouches 14.12 as the pouches revolve with the rotor and while the pouches are held stationary by the adjacent sealing heads 18. In order to effect the filling of such pouches, filling apparatus may be carried on a turret T superposed above the rotor 17 and having depending, extendible and retractable filler tubes T.1 which may extend down into the pouches 14.12 as the film and pouches revolve with the rotor and while the filler tubes T.1 revolve with the turret T at the same rate of speed as the rotor 17.

While the details of the filler turret T and the filler tubes T.1 are not shown, it will be understood that such filling turrets for filling bottles and packages are known to persons of skill in the art. The disclosure in connection with FIGS. 12–16 is intended to clearly illustrate that the package forming and sealing machine may be used in various ways and may be oriented horizontally as well as vertically.

While the exact positioning of the filler tubes T.1 is not illustrated, it should be understood that such filler tubes will necessarily be adapted for relocation at various positions closer to or farther from the rotation axis 17.1 so that the filler tubes will be insertable into the pouches 14.12 in accordance with the particular location of the forming and sealing heads 18. In the form of the invention illustrated in FIG. 12, the heads 18 of the rotor 17 therein illustrated are radially adjustable to accommodate packages or pouches of various sizes as hereinbefore described.

What is claimed is:

1. A package processing machine receiving an elongate conveyed sheet material wrapper, comprising
   a rotor with peripheral portions moving at the speed of the elongate conveyed wrapper,
   a plurality of jaw heads on the rotor and regularly spaced about the peripheral portions thereof, the heads having closable and openable jaws arranged to transversely grip and hold the elongate wrapper which extends between adjacent jaws and partially around the rotor at said peripheral portions,
   the heads having operating means for opening and closing the jaws,
   radial means slidably mounting the jaw heads on the rotor for radial inward and outward movement,
   an elongate peripheral actuator extending peripherally of the rotor and engaging the operating means of each of the heads and producing opening and closing of the jaws as the rotor revolves, the rotor revolving relative to the peripheral actuator, said peripheral actuator being peripherally distensible and constrictable and thereby being radially movable relative to the rotor, and
   coordinated means simultaneously moving all of the jaw heads radially of the rotor and correspondingly radially moving portions of the peripheral actuator to maintain the engaging relation to the operating means of the heads and thereby accommodate desired closing and opening of the jaws relative to various lengths of the wrapper.

2. The package processing machine according to claim 1 and the radial means including elongate radial guideways on the rotor, and each of the heads having a mounting block confined in a respective guideway.

3. The package processing machine according to claim 1 and the operating means including a powered rotary shaft on each of the heads for operating one jaw, the shafts moving radially of the rotor with the heads in response to the coordinated means.

4. The package processing machine according to claim 3 and the operating means including power input means connected with the peripheral actuator and supplying rotary power for opening and closing the jaws throughout significant portions of the cycle of the rotor, and clutch means for each shaft interruptably connecting the power input means to the shaft.

5. The package processing machine according to claim 4 and the clutch means limiting the shaft to one revolution for each rotary cycle of the rotor, the operating means closing and reopening the jaws for each revolution of the shaft.

6. The package processing machine according to claim 1 and the elongate jaws extending from the rotor and substantially parallel to the rotor axis, each head having an elongate cantilever frame mounting the jaws and having an inner end with a mounting block attached to the rotor, and the cantilever frame also having an outer end remote from the rotor.

7. The package processing machine according to claim 6 and one of the jaws of each head being stationary with the cantilever frame, the other jaw of each head being swingably mounted at one end of the cantilever frame for swinging toward and outwardly away from the stationary jaw and from the rotor axis between closed and open positions.

8. The package processing machine according to claim 7 and including mounting means hinging the other swingable jaw to the outer end of the cantilever frame.

9. The package processing machine according to claim 8 and the mounting means including a hinge on the cantilever frame, and a stiff spring rod connecting the jaw to the hinge.

10. The package processing machine according to claim 9 and the operating means including locking means retaining the swingable jaw in clamping relation with the stationary jaw and against the force of the spring rod.

11. The package processing machine according to claim 8 and the operating means including elongate power delivery means extending along and mounted on the cantilever frame and disposed between the jaw and the rotor axis, and a swinging linkage traversing the outer end of the frame and connected with the power delivery means and the other swingable jaw for operating the swingable jaw between closed and open positions.

12. The package processing machine according to claim 7 and each head including a cutoff knife adjacent the stationary jaw, mounting and actuating means normally retaining the knife behind the wrapper-gripping face of the stationary jaw and projecting the knife toward the swingable jaw in response to closing of the swingable jaw against the stationary jaw to cut the wrapper.

13. The package processing machine according to claim 12 and the operating means including a swinging linkage at each head connected with the swingable jaw to produce swinging thereof between closed and open positions, the linkage also operating the mounting and actuating means to project the knife to cut the wrapper in response to closing of the swingable jaw.

14. The package processing machine according to claim 1 wherein said rotor is oriented to revolve about a horizontal axis.

15. The package processing machine according to claim 1 and said rotor being oriented to revolve about a vertical axis.

16. The package processing machine according to claim 1 wherein said sealing heads having cutting means to sever the wrapper while the wrapper is being gripped and sealed.

17. The package processing machine according to claim 1, said peripheral actuator comprising a chain with an open ended loop about the periphery of the rotor, the chain having a bight adjacent the loop and spaced from the periphery of the rotor.

18. The package processing machine according to claim 17 wherein said loop extends around substantially more than one half of the periphery of the rotor, and said bight has a shape significantly different than that of the loop.

19. A package forming and sealing machine receiving a conveyed sheet material wrapper including opposed surfaces confronting each other and producing discrete packages formed therefrom, comprising
    rotor with the peripheral portions moving at the speed of the conveyed wrapper,
    a plurality of sealing heads on the rotor and regularly spaced about the periphery thereof, the heads having sealing jaws to transversly grip and seal the conveyed wrapper into discrete sealed packages which are formed and located between adjacent jaws and extend partially around the rotor at said peripheral portions,
    operating means for opening and closing the jaws to receive the conveyed wrapper and release the sealed packages, the operating means including a plurality of rotary shafts each on a respective head for operating one of the jaws thereof, a plurality of sprockets each connected with a respective shaft, the sprockets being disposed adjacent each other around the periphery of the rotor,
    an endless chain having a loop trained around the periphery of the rotor and engaged with the sprockets to produce a rolling of the sprockets along the chain as the rotor is turned, whereby to operate the jaws,
    radial means slidably mounting the sealing heads on the rotor for radial inward and outward movement, and
    coordinated means simultaneously moving all of the sealing heads including said shafts radially of the rotor to accommodate the production of sealed packages of various lengths.

20. The package forming and sealing machine according to claim 6 and drive means producing travel of the chain around the loop to change the rotary speed of the sprockets or rolling therealong as the rotor revolves.

21. The package forming and sealing machine according to claim 7 and take-up means connected with the endless chain to accommodate variations in the size of the loop as the radial positions of the heads are changed on the rotor, and the drive means having variable speed to accommodate changing of the speed of the chain in relation to the size of the loop necessary to embrace the sprockets.

22. The package forming and sealing apparatus according to claim 6 and yieldable take-up means acting on the chain and drawing the loop of the chain tightly onto the sprockets, the take-up means being yieldable to pay out chain as the loop of the chain increases in size in response to coordinated radial outward moving of the heads and sprockets on the rotor.

23. A package forming and sealing machine receiving a conveyed sheet material wrapper including opposed surfaces confronting each other and producing discrete packages formed therefrom, comprising
    a rotor with peripheral portions moving at the speed of the conveyed wrapper,
    a plurality of sealing heads on the rotor and regularly spaced about the periphery thereof, the heads having sealing jaws arranged to transversly grip and seal the conveyed wrapper into discrete sealed packages which are formed and located between adjacent jaws and extend partially around the rotor at said peripheral portions, operating means for opening and closing the jaws to receive the conveyed wrapper and release the sealed packages, the operating means including plurality of rotary shafts each on a respective head for operating one of the jaws thereof, the operating means also including power input means supplying rotary power for each of the shafts throughout the significant portions of the cycle of the rotor, and clutch means for each shaft interruptibly connecting the power input means to the shaft, the clutch means for each shaft having a releasable detent means sequentially retaining the jaws in the closed sealing phase and in the open package releasing phase, each phase continuing for a significant portion of the rotary cycle of the rotor, radial means slidably mounting the sealing heads on the rotor for radial inward and outward movement, and coordinated means simultaneously moving all of the sealing heads radially of the rotor to accommodate production of sealed packages of various lengths.

24. The package forming and sealing machine according to claim 12 and the detent means including a clutch hub in driving relation to the shaft and having detent notches spaced about its periphery, and also including a trip arm on the rotor and with a detent pawl bearing against the hub and fittable into the detent notches, to disengage the clutch means whereby to disengage the power input means from the shaft, and stationary cam means adjacent the turning rotor to progressively engage and move the successive trip arms passing thereby and release the detent means and thereby engaging the clutch to connect the power input means to the shaft for operating the jaws.

25. The package forming and sealing machine according to claim 12 and the clutch means for each shaft including a trip arm for engaging and disengaging the clutch means as the rotor revolves, and stationary cam means adjacent the turning rotor to progressively engage and move the successive trip arms to operate the clutch.

26. The package forming and sealing machine according to claim 14 and including non-rotatable means slidably mounting the stationary cam means adjacent the rotor and moving the cam means radially toward and away from the rotor axis in coordinated relation with the radial movement of the head.

27. The package forming and sealing machine according to claim 15 and including means connecting the non-rotatable means with the coordinated means for simultaneously moving the heads and stationary cam means radially of the rotor axis.

28. A package forming and sealing machine receiving a conveyed sheet material wrapper including opposed surfaces confronting each other and producing discrete packages formed therefrom, comprising a rotor with peripheral portions moving at the speed of the conveyed wrapper, a plurality of sealing heads on the rotor and regularly spaced about their periphery thereof, the heads having elongate sealing jaws arranged to transversly grip and seal the wrapper into discrete sealed packages which are formed and located between adjacent jaws and extend partially around the rotor at said peripheral portion, the jaws extending from the rotor and substantially parallel to the rotor axis, each head having an elongate cantilever frame mounting the jaws and having an inner end with a mounting block attached to the rotor, the cantilever frame also having an outer end remote from the rotor, one of the jaws of each head being stationary with the cantilever frame, the other jaw of each head being swingably mounted at one end of the cantilever frame for swinging toward and outwardly away from the stationary jaw and from the rotor axis between closed and open positions, operating means for opening and closing the jaws to receive the conveyed wrapper and release the sealed packages, the operating means including a swinging linkage for each head and connected with the swingable jaw and producing swinging thereof between closed and open positions, the linkage including multiple pivots moving to an over-center position when the swingable jaw is in closed position to effectively lock the jaw in closed position, radial means slidably mounting the sealing heads on the rotor for radial inward and outward movement, and coordinated means for simultaneously moving all of the sealing heads radially of the rotor to accommodate production of sealed packages of various lengths.

29. A package forming and sealing machine receiving a conveyed sheet material wrapper including opposed surfaces confronting each other and producing discrete packages formed therefrom, comprising a rotor with peripheral portions moving at the speed of the conveyed wrapper, a plurality of sealing heads on the rotor and regularly spaced about the periphery thereof, the heads having sealing jaws arranged to transversly grip and seal the conveyed wrapper into discrete sealed packages which are formed and located between adjacent jaws and extend partially around the rotor at said peripheral portions, at least one jaw of each of the heads being swingable relative to the other jaw, and operating means for opening and closing the jaws to receive the conveyed wrapper and release the sealed packages, the operating means also including a rotary shaft at each head having a crank arm which is connected by a linkage to said one swingable jaw for swinging the jaw between closed and open positions, a common drive connected to all of the shafts of the heads and producing coordinated rotation of the shafts as the rotor revolves, the common drive including an endless chain in a loop adjacent the peripheral portion of the rotor, and a plurality of sprockets, each on a respective head and connected with the rotary shaft thereof and engaging the loop of chain to roll thereon as the rotor revolves.

30. A package forming and sealing machine receiving a conveyed sheet material wrapper including opposed surfaces confronting each other and producing discrete packages formed therefrom, comprising a rotor with peripheral portions moving at the speed of the conveyed wrapper, a plurality of sealing heads on the rotor and regularly spaced about the periphery thereof, the heads having sealing jaws arranged to transversly grip and seal the tubular wrapper into discrete sealed packages which are formed and located between adjacent jaws and extend partially around the rotor at said peripheral portions, and operating means for opening and closing the jaws to receive the conveyed wrapper and release the formed packages, the operating means including rotary means on the heads to operate the jaws, a drive sprocket on each of the heads connected to said rotary means, and a chain with a loop adjacent the peripheral portions of the rotor and engaged with the sprockets of the heads, the sprockets rolling along the chain as the rotor turns to open and close the jaws.

31. The package forming and sealing machine according to claim 29 and the rotary means on each head including a clutch producing alternate engagement and disengagement between the swingable jaw and the sprocket.

32. The package forming and sealing machine according to claim 30 and the endless chain also having a bight adjacent the loop but spaced from the rotor and the chain also having spaced portions connecting the bight with the loop, the sprockets disengaging the chain to travel between the spaced portions as the rotor revolves, and the rotary means including a brake on each of the heads between the clutch and jaw and preventing any possible opening of the jaw while the sprocket is disengaged from the chain.

33. A package forming and sealing machine receiving a conveyed sheet material wrapper including opposed surfaces confronting each other and producing discrete packages formed therefrom, comprising a rotor rotatably mounted on a frame with peripheral portions moving at the speed of the conveyed wrapper, a plurality of sealing heads on the rotor and regularly spaced about the periphery thereof, operating means connected with the revolving heads to effect the sealing and releasing of the wrapper and sealed and discrete packages formed therefrom, the operating means including an operable clutch for each head, radial means slidably mounting the sealing heads on the rotor for radial inward and outward movement, coordinated means simultaneously moving all of the sealing heads radially of the rotor to accommodate production of such discrete packages of various lengths, and a plurality of stationary cams mounted on said frame to operate the clutches on the heads as the rotor and heads revolve, and means for moving all of the stationary cams radially of the rotor axis to coordinate with the radial position of the heads when radially relocated by the coordinated means.

* * * * *